7871X
E. Town.
Cook Stove.
Patented Dec. 16, 1833
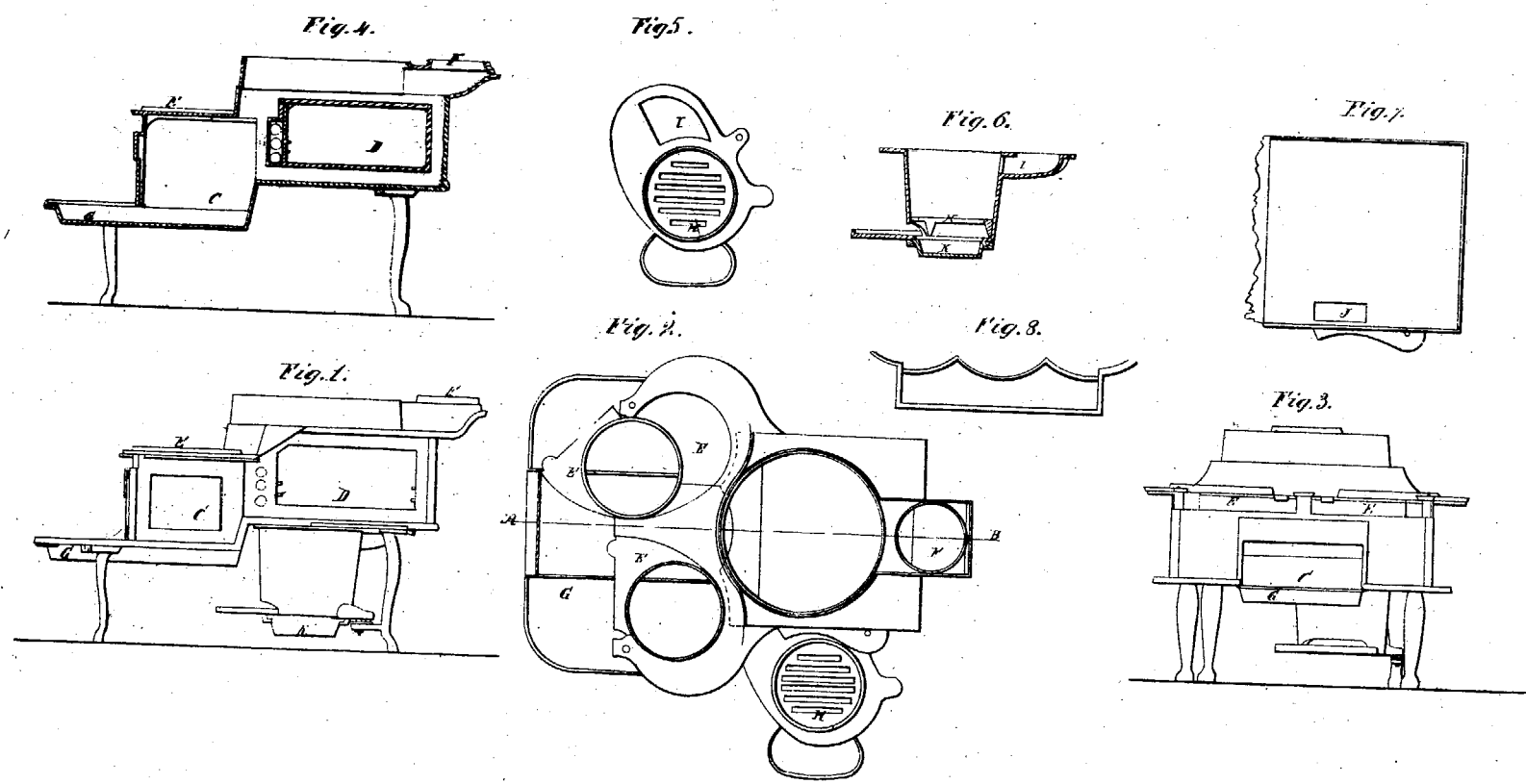

12/16/1833 7877X

25

Dec. 16. 1833 Pat. No. 37 [illegible]

Elisha Town of Montpelier, Vermont.

Letters Patent.

Patented Dec. 16. 1833 Refund Sept. 28. 1836.

The Schedule referred to in these Letters Patent, and making part of the same.

To all to whom it may concern.

Be it known that I Elisha Town of Mont Pelier in the County of Washington and State of Vermont have invented a new and useful improvement in cooking Stoves called Elisha Towns improved crane Stove, and I do hereby declare that the following is a full & exact description. This Stove consists of a bottom plate cast whole excepting that part directly under the fire room and is about three feet and eight inches long one half of which is somewhat eliptical and constitutes the hearth and seat for the fire room and is about two feet and ten inches wide at the front of the body of the Stove. The other half of the bottom plate passes off horizontally & parallel to the hearth part and is reduced to the width of twenty eight inches and is of a rectangular form, the seat of the fire room is cast in a separate piece from the other part of the bottom plate and is placed into and rests upon flanches upon the sides and ends of the main portion of the bottom plate, and is sunk, two inches below the surface of the hearth, directly over this part of the bottom plate, the oven and the flues passing under, and at the back side of the oven, are placed. The bottom plate rests upon four legs, on the edges of the rectangular part of the bottom plate, and upon the hearth are cast flanches for fixing the side plates of the stove in their proper positions. The sides are about twelve inches high and covered by a top plate corresponding nearly in its form to the bottom plate except that part of the bottom plate which is necessary for a hearth in front of the [illegible] body of the Stove. In the top plate over the fire room and in front of and between the cranes is a boiler hole about eight inches in diameter diameter and the back part of the top plate is a hole and collar for
the stove pipe. The oven is constructed by passing plates from
side to side of the stove leaving spaces of about one and one
half inches between it and the bottom. top and back plates. These
spaces are the flues for conveying the flame and heat or smoke
around the oven and to the pipe. In front of the oven and between
it and the fire room, is a chamber formed on the back side
by an oven plate, and in front and on the top by a thick plate
S( the bottom of this chamber being formed by an extension of the
bottom plate of the oven and by means of this chamber the tem
=perature of the oven is equalized. Between the chamber & fire
room is a thick plate distant about two inches from the chamber
and reaching within about five or six inches of the top plate.
The fire room occupies the front part and about one third of the
body of the stove. The heat is regulated by a damper in the front
part of the fire room which slides up, and down in grooves
directly over the fire room are two boiler places which I call
cranes. These cranes revolve by axes being placed in the
rear corners of the fire room on the sides of the stove, with their pivots
inserted in the bottom and top plates. They are from three to four
inches deep and parallel when swung in, with the sides of the
stove without bottoms and with collars for resting places for
kettles. These cranes are cast in parts separate from the top plate
when swung forward, the projecting top plates or wings assume
the places of the boiler holes and prevent the passage of the fire
and smoke into the room by swinging the boilers off they are
deprived of the greatest portion of the heat of the fire and the
quantity of the heat necessary for cooking is regulated thereby as
a current of cold air is then permitted to pass underneath the boiler
so as to drive the heat from the same. What I claim as my invention
and desire to secure by Letters Patent is the application of the cranes or
hinge to the boiler places in cooking stoves as herein described.
Witnesses Samuel B Prentiss Elisha Town
[illegible]

12/16/1883

[illegible] Letters Patent [illegible] Dec 16 1833

This Schedule contains a description of improvements [illegible]
recommended to Letters Patent granted to Elisha Town bearing
date the 16th day of December 1833 and making part of the same.

To all to whom it may concern.

Be it known that I Elisha Town of Montpelier in the County of [illegible]
Washington and State of Vermont have invented a new and
useful improvement on "Elisha Towns Cook Stove, called Elisha
Towns improved Cook Stove, and I do hereby declare that the
following is a full and exact description of said improvement
The improvement consists in and differs from the original
invention in these respects. The bottom plate is cast whole [illegible]
that under one end of the oven, is a circular hole, about eleven
inches in diameter, coinciding with a similar hole in the top of a
furnace hereinafter mentioned. The rear part of the bottom plate
commencing at the back side of the fire seat rises three inches in
heighth and is reduced in width to twenty two inches. It extends
out from under one end of the oven, two and one half inches so that
the leg may be bolted to it. To this leg is attached to this leg is [illegible]
-ed in the following manner, a furnace from the leg and about a foot
below the bottom plate, is a projection of sufficient size to admit of a
5/8 inch hole with a female screw cut in the same, and of such strength
as will be required to support the weight of the furnace and utensils or
whatever may be necessary to use about it. Through this hole in
the projection is passed a male screw, in a vertical position
with a cavity in the upper end, which forms the step for the lower
end of the axis of motion of the furnace. This axis is cast solid
in a corner of a furnace which is in the form of the letter D. and the
upper pivot of the axis is inserted into a circular hole in the bottom
plate near the leg and directly over the step. The furnace is about
three inches deep near the bottom of which is a grate to receive the
fuel. This [illegible] is secured in its place by resting upon the [illegible]
[illegible] edge of a rim about one inch wide in the letter D. form

[illegible]

fastened to the lower edge of the sides of the furnace by rods
from the top plate. Beneath the grate is an ash pit made to
slide upon flanches cast upon the under side of the before
mentioned bars and by the sliding in or out of the ash pit
it is made to regulate the draught of the air upon the fire in
the furnace and to receive the ashes. The top of the furnace
is a plate covering the sides thereof and projecting from the
body in such form as to close the hole in the bottom in the
~~bottom~~ plate of the stove when the furnace is revolved or
turned out for use. This top plate is pierced over the grate with
a hole about eleven inches in diameter for the use of kettles
and coincides with the hole before mentioned in the bottom
plate directly beneath the oven, and through which the fire
and smoke passes off. A flue from the furnace passes under=
neath the wing or projecting part of the top plate a suffi
=cient distance and of a proper size to carry off the smoke
which is let through the wing under the hole in the bottom
plate when the furnace is swung out. This flue is closed
by swinging the furnace under and the flame and smoke
passes through the corresponding holes in the top plate of the
and may be [illegible] the oven
furnace and bottom plate to the flue under the oven. The
part sunk for the ash pit extends through the centre and
to the front edge of the hearth and that part of the ash pit
in the hearth in the front of the stove is covered by a move=
able slide; in the front part of the stove is no damper, and
its place is supplied by a double door. The top plate consists in and
differs from the top plate in the original invention in these respects
The boilers are inserted in the front part of the stove instead
of the sides. The plate at each side of the stove and opposite
the cranes is of a semicircular form, and extends over the sides of
the stove so far as to cover the wings of the cranes when the
cranes are swung in. In front of and between the cranes
is no boiler placed. This plate from and in rear of the [illegible]
is a is ~~is~~ elevated about two inches. Over the oven in the elevated part and commencing at the back side of the fire seat is an boiler hole about eighteen inches in diameter and with a collar about four inches high. In the rear of the boiler hole is a hole and collar for the stove pipe with a connecting flue between them. The part occupied by the stove pipe extends out beyond the body of the stove one half of the diameter of the pipe hole. In the back flue is a damper, which is moved by a rod connected with the same and extending out of the back end of the stove. Between the chambers and the fire seat, is a plate. at the ends of the chamber the sides of the stove are pierced with holes for the ventilation of the air. The oven is between three and four inches under in this than in the original invention.

What I claim as my invention and improvement is the addition and application of the hearth furnace to my original invention in ~~the~~ cooking stoves as herein described.

Witnesses
[illegible]
Saml A. Prentiss

Elisha Town

Dr in portfolio

I hereby certify the foregoing additional schedule has this twenty ninth day of September 1836 been duly annexed to the original Patent of Elisha Town, and that the same is duly recorded on the books of the Patent Office and that [illegible] fifteen dollars (the duty by law required) has been paid into the treasury of the United States Henry L. Ellsworth
Commissioner 1937 [illegible]